(12) United States Patent
Lee et al.

(10) Patent No.: US 11,878,569 B2
(45) Date of Patent: Jan. 23, 2024

(54) AIR CIRCULATOR FOR VEHICLE

(71) Applicants: Hyundai Motor Company, Seoul (KR); Kia Motors Corporation, Seoul (KR); Hanon Systems, Daejeon (KR)

(72) Inventors: Jae Woo Lee, Gyeonggi-do (KR); Dae Woong Lee, Daejeon (KR); In Keun Kang, Daejeon (KR)

(73) Assignees: Hyundai Motor Company, Seoul (KR); Kia Motors Corporation, Seoul (KR); Hanon Systems, Daejeon (KR)

( * ) Notice: Subject to any disclaimer, the term of this patent is extended or adjusted under 35 U.S.C. 154(b) by 316 days.

(21) Appl. No.: 17/082,700

(22) Filed: Oct. 28, 2020

(65) Prior Publication Data

US 2021/0347229 A1 Nov. 11, 2021

(30) Foreign Application Priority Data

May 8, 2020 (KR) .................. 10-2020-0055323

(51) Int. Cl.
*B60H 1/24* (2006.01)
*B60H 1/00* (2006.01)
*B60H 3/06* (2006.01)

(52) U.S. Cl.
CPC ......... *B60H 1/245* (2013.01); *B60H 1/00564* (2013.01); *B60H 1/00671* (2013.01); *B60H 3/0608* (2013.01); *B60H 1/00371* (2013.01); *B60H 2001/00721* (2013.01)

(58) Field of Classification Search
CPC ............ B60H 1/245; B60H 1/00564; B60H 1/00671; B60H 1/00371; B60H 2001/00721; B60H 3/0608
USPC ..................................................... 454/137
See application file for complete search history.

(56) References Cited

U.S. PATENT DOCUMENTS

| | | | | |
|---|---|---|---|---|
| 5,501,634 A | * | 3/1996 | Wilder | B60H 1/3421 454/109 |
| 6,508,076 B1 | * | 1/2003 | Gast | B65D 88/745 62/239 |
| 2009/0032216 A1 | * | 2/2009 | Kim | B60H 3/0085 55/490.1 |
| 2015/0017902 A1 | * | 1/2015 | Sakurai | B60H 1/247 454/143 |
| 2015/0165865 A1 | * | 6/2015 | Park | B60H 1/00285 62/3.2 |

FOREIGN PATENT DOCUMENTS

| | | | | |
|---|---|---|---|---|
| JP | 4307173 B2 | | 8/2009 | |
| KR | 2009061132 A | * | 6/2009 | ......... B60H 1/00371 |
| KR | 2014-0123563 A | | 10/2014 | |

* cited by examiner

*Primary Examiner* — Allen R. B. Schult
(74) *Attorney, Agent, or Firm* — Fox Rothschild LLP

(57) ABSTRACT

An air circulator for a vehicle is provided. The air circulator includes a blower case and a connection duct that is connected to an outlet of the blower case. The connector duct includes a first path and a second path that are divided by a separation plate. Additionally, a filter is mounted in the outlet of the blower case and an inlet door is mounted in the blower case to selectively allow air to be blown into the first path and/or the second path.

12 Claims, 12 Drawing Sheets

AIR CIRCULATOR FOR VEHICLE

CROSS-REFERENCE TO RELATED APPLICATION

This application is based on and claims the benefit of priority to Korean Patent Application No. 10-2020-0055323, filed on May 8, 2020, the disclosure of which is incorporated herein in its entirety by reference.

TECHNICAL FIELD

The present disclosure relates to an air circulator for a vehicle, and more particularly, to an air circulator for a vehicle capable of selectively or simultaneously operating in a direct mode in which air is directly blown to occupants seated in a passenger compartment of a vehicle and a diffusion mode in which air is uniformly diffused and blown throughout the entire passenger compartment.

BACKGROUND

An air circulator (or blower) may be located within a passenger compartment of a vehicle by considering comfort, convenience, etc. for the passenger compartment. The air circulator may circulate air in the passenger compartment by blowing the air to occupants seated in the passenger compartment, thereby improving comfort and convenience for the passenger compartment. The air circulator may have various structures to be applied to various vehicles in various ways.

An air circulator according to the related art includes an evaporator core and two blower units embedded in a case, and has two or more air flow paths by additionally mounting a connection duct in an air vent (air outlet). However, the air circulator according to the related art does not have a structure for adjusting an air direction, and the air is blown to a local area in the passenger compartment, and thus the overall air circulation in the passenger compartment is not smooth. In addition, the air in high occupancy vehicles such as SUVs and MPVs is only blown to occupants seated in rear seats.

The above information described in this background section is provided to assist in understanding the background of the inventive concept, and may include any technical concept which is not considered as the prior art that is already known to those skilled in the art.

SUMMARY

The present disclosure provides an air circulator for a vehicle capable of selectively or simultaneously operating in a direct mode in which air is directly blown to occupants seated in a passenger compartment of a vehicle and a diffusion mode in which air is uniformly diffused and blown throughout the entire passenger compartment.

According to an aspect of the present disclosure, an air circulator for a vehicle may include: a blower case; a connection duct connected to an outlet of the blower case, and having a first path and a second path divided by a separation plate; a filter mounted in the outlet of the blower case; and an inlet door mounted in the blower case to selectively allow air to be blown into the first path and/or the second path.

The separation plate may extend in a longitudinal direction of the connection duct, and the first path and the second path may be divided by the separation plate in a vertical direction of the connection duct. The first path may be located above the second path, the first path may allow the air to diffuse into an entire space of a passenger compartment, and the second path may allow the air to be directly blown to occupants seated in seats of the vehicle.

The connection duct may have a first end portion connected to the outlet of the blower case and a second end portion opposing the first end portion, and the connection duct may have a plurality of diffusion outlets that communicate with the first path, and a plurality of direct outlets that communicate with the second path. Each diffusion outlet may protrude horizontally from the connection duct.

The plurality of diffusion outlets may include a first diffusion outlet disposed in the second end portion of the connection duct, and a pair of second diffusion outlets symmetrically disposed in both left and right sides of the connection duct. Each direct outlet may protrude obliquely from the connection duct toward a lower space of a passenger compartment. The plurality of direct outlets may include a first direct outlet disposed in the second end portion of the connection duct, and a pair of second direct outlets symmetrically disposed in both left and right sides of the connection duct.

The inlet door may include a shaft flush with the separation plate, and a flap that extends from the shaft. The inlet door may be disposed to face an upstream end of the filter. The blower case and the connection duct may extend in a longitudinal direction of the vehicle. The blower case and the connection duct may extend in a width direction of the vehicle. The air circulator may further include a thermoelectric module mounted to the blower case, and the thermoelectric module may include an internal portion located inside the blower case and an external portion located outside the blower case.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
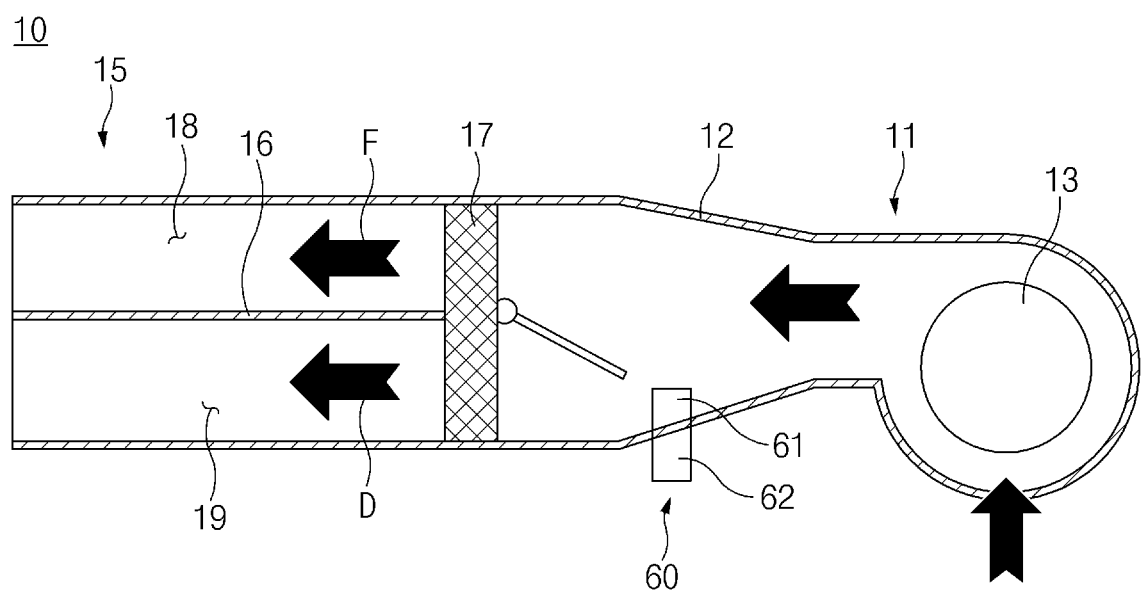
FIG. 1 illustrates the configuration of an air circulator for a vehicle according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be ruled out in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 2:
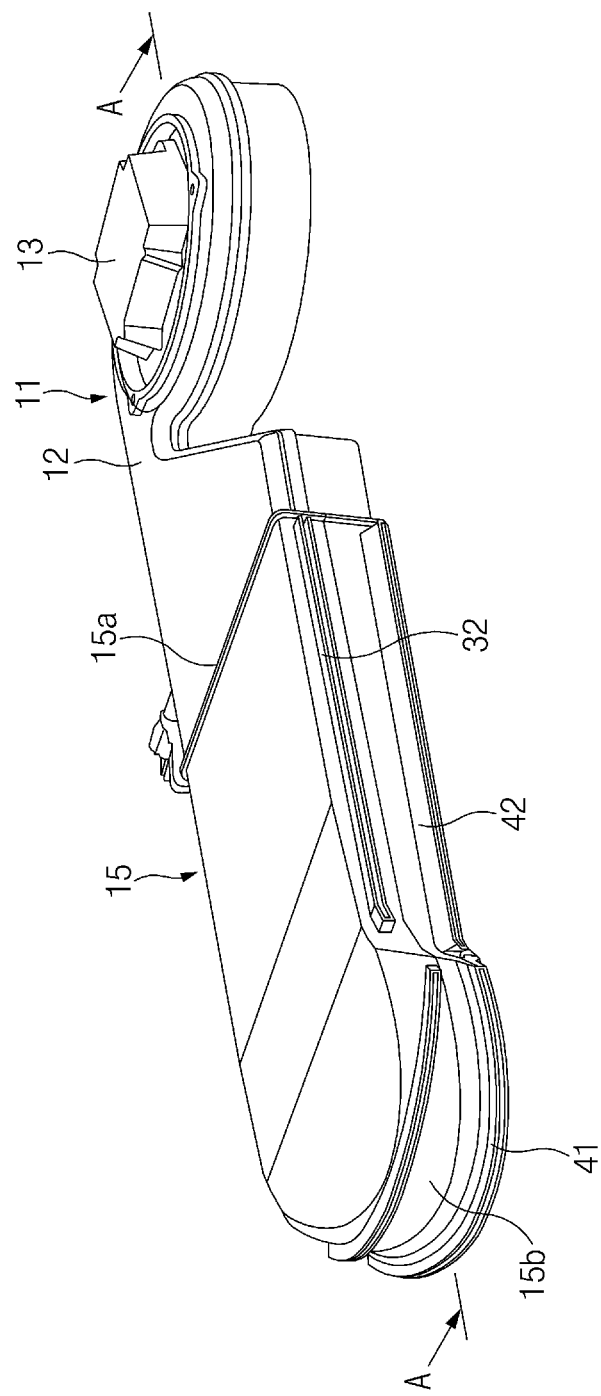
FIG. 2 illustrates a perspective view of an air circulator for a vehicle according to an exemplary embodiment of the present disclosure.
Figure 3:
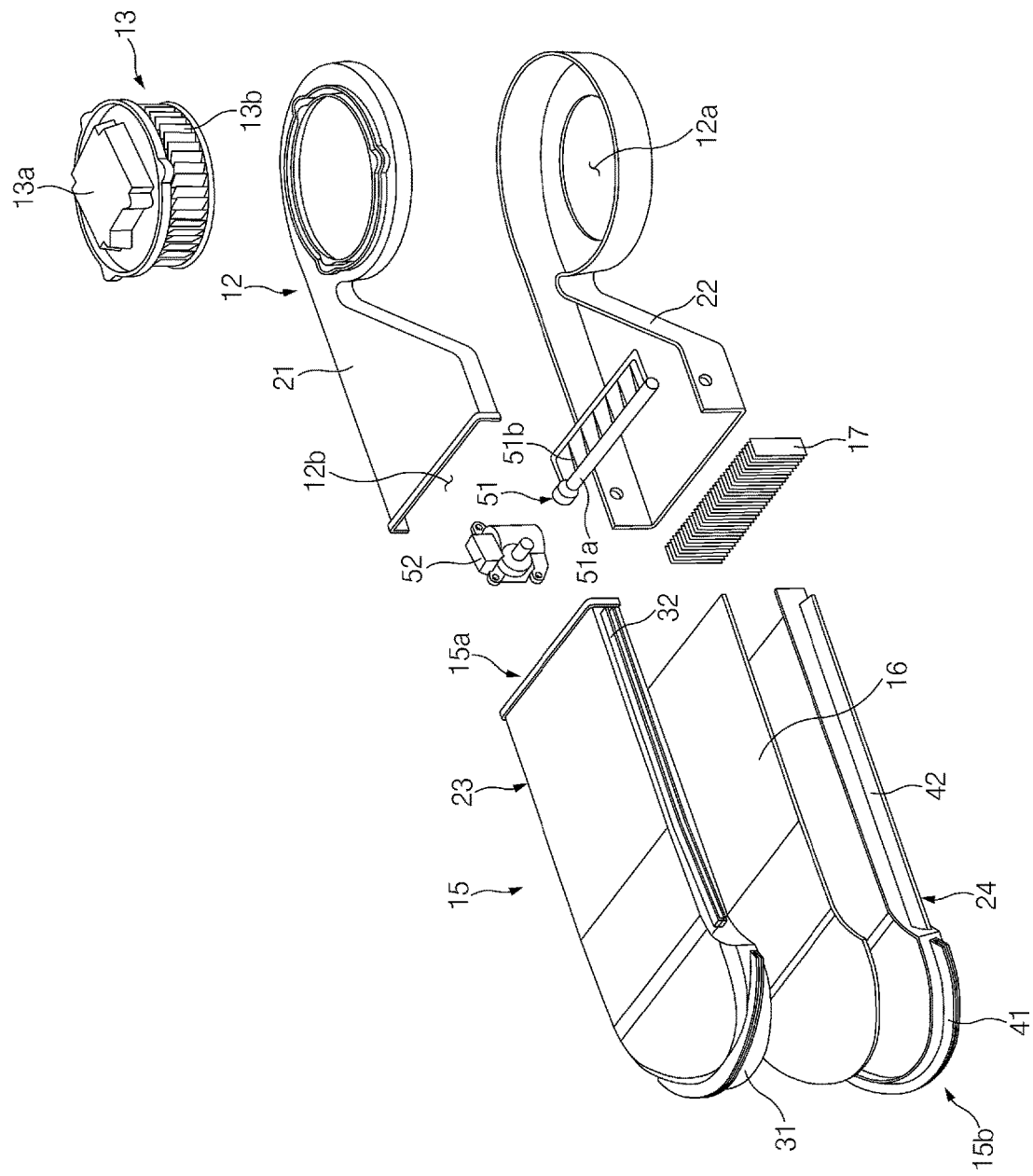
FIG. 3 illustrates an exploded perspective view of an air circulator for a vehicle according to an exemplary embodiment of the present disclosure.

Referring to FIG. 1, an air circulator 10 for a vehicle according to an exemplary embodiment of the present disclosure may include a blower unit 11 having a blower case 12 and a wheel/motor assembly 13 mounted in the blower case 12, a connection duct 15 connected to an outlet 12b of the blower case 12, and a filter 17 mounted in the outlet 12b of the blower case 12. Referring to FIGS. 2 and 3, the blower unit 11 may include the blower case 12 having a scroll shape or a volute shape and the wheel/motor assembly 13 mounted in the blower case 12.

The blower case 12 may have an inlet 12a allowing the inflow of air, and the outlet 12b allowing the discharge of air. The blower case 12 may have a curved funnel shape of which an area gradually increases toward the outlet 12b, such as a scroll shape or a volute shape. Referring to FIG. 3, the blower case 12 may include an upper case 21 and a lower case 22, and the upper case 21 and the lower case 22 may be a pair of half cells detachably coupled to each other. Thus, the filter 17, an inlet door 51 and a door actuator 52 to be described below may be combined into the blower case 12 more easily and quickly. The inlet 12a may be formed in the lower case 22.

The wheel/motor assembly 13 may be a combined structure of a blower wheel 13a and a blower motor 13b, and the wheel/motor assembly 13 may be disposed to face the inlet 12a of the blower case 12. As the blower motor 13b operates, the blower wheel 13a may rotate, and thus the air (e.g., intake air) in a passenger compartment may be introduced through the inlet 12a of the blower case 12 and be blown into the connection duct 15.

Referring to FIG. 1, the air circulator 10 for a vehicle according to an exemplary embodiment of the present disclosure may further include a thermoelectric module 60 mounted to the blower case 12. The thermoelectric module 60 may be configured to cool or heat the air passing through the blower case 12 so that the cold air or hot air may be blown. The thermoelectric module 60 may include an internal portion 61 located inside the blower case 12 and an external portion 62 located outside the blower case 12. A plurality of thermoelectric elements (e.g., N-type thermoelectric elements and P-type thermoelectric elements), a plurality of electrodes, and the like may be disposed between the internal portion 61 and the external portion 62. The internal portion 61 may be an internal insulation board located within the blower case 12, and the external portion 62 may be an external insulation board located outside the blower case 12.

As the polarity of a voltage applied to the plurality of electrodes changes, the direction of a current may change, and thus the internal portion 61 may change between cold side and hot side, and the external portion 62 may change between cold side and hot side. For example, when a forward voltage is applied to the electrodes, the internal portion 61 may change to the cold side, and the external portion 62 may change to the hot side. When the internal portion 61 changes to the cold side, the air coming into contact with the internal portion 61 may be cooled, and thus the low-temperature air (cold air) may be blown into the passenger compartment (cooling). When a reverse voltage is applied to the electrodes of the thermoelectric module 60, the internal portion 61 may change to the hot side, and the external portion 62 may change to the cold side. When the internal portion 61 changes to the hot side, the air coming into contact with the internal portion 61 may be heated, and thus the high-temperature air (hot air) may be blown into the passenger compartment (heating).

The connection duct 15 may be sealingly connected to the outlet 12b of the blower case 12, and the connection duct 15 may have two or more paths 18 and 19 divided by at least one separation plate 16. In addition, the separation plate 16 may extend in a longitudinal direction of the connection duct 15, and thus a first path 18 and a second path 19 may extend in the longitudinal direction of the connection duct 15. Additionally, the first path 18 and the second path 19 may be divided by the separation plate 16 in a vertical direction of the connection duct. The connection duct 15 may have a first end portion 15a and a second end portion 15b. The first end portion 15a may be sealingly connected to the outlet 12b of the blower case 12, and the second end portion 15b may oppose the first end portion 15a.

Referring to FIG. 3, the connection duct 15 may include an upper duct 23 and a lower duct 24, and the upper duct 23 and the lower duct 24 may be half-cell type ducts detachably coupled to each other. The separation plate 16 may be combined between the upper duct 23 and the lower duct 24 to simplify the assembly of the connection duct 15. A bottom end of the upper duct 23 may be open, and a top end of the lower duct 24 may be open. Since the separation plate 16 is combined with the bottom end of the upper duct 23 and the top end of the lower duct 24, the first path 18 and the second path 19 may be divided by the separation plate 16 within the connection duct 15.

Referring to FIGS. 1 and 3, the first path 18 may be defined by an inner surface of the upper duct 23 and the separation plate 16, and the second path 19 may be defined by an inner surface of the lower duct 24 and the separation plate 16. For example, the first path 18 may induce (allow) the air to diffuse into the entire space of the passenger compartment, and the second path 19 may induce (allow) the air to be directly blown to occupants seated in (front and rear) seats of the passenger compartment.

The connection duct 15 may have a plurality of diffusion outlets 31 and 32 that communicate with the first path 18, and the plurality of diffusion outlets 31 and 32 may blow the air (e.g., diffusion air) having passed through the first path 18 horizontally toward a ceiling (e.g., headlining) of the vehicle. In particular, each of the diffusion outlets 31 and 32 may protrude horizontally from the connection duct 15, and the air may be discharged horizontally to the passenger compartment through the diffusion outlets 31 and 32 to allow the air to circulate from top to bottom in the passenger compartment, and thus the air may be uniformly diffused throughout the passenger compartment.

According to an exemplary embodiment, the plurality of diffusion outlets 31 and 32 may include a first diffusion outlet 31 formed in the second end portion 15b of the connection duct 15, and a pair of second diffusion outlets 32 symmetrically formed in both left and right sides of the connection duct 15. The first diffusion outlet 31 may protrude horizontally from the second end portion 15b of the connection duct 15 toward the rear of the vehicle by a predetermined length, and the second diffusion outlets 32 may protrude horizontally from the left and right sides of the connection duct 15 toward the left and right sides of the vehicle by a predetermined length.

The connection duct 15 may have a plurality of direct outlets 41 and 42 that communicate with the second path 19, and the plurality of direct outlets 41 and 42 may blow the air (direct air) having passed through the second path 19 to the occupants seated in the (front and rear) seats of the passenger compartment. In particular, each of the direct outlets 41 and 42 may protrude obliquely from the connection duct 15 toward a lower space of the passenger compartment, and the air may be discharged obliquely to the lower space of the passenger compartment through the direct outlets 41 and 42, and thus the air may be directly blown to the occupants.

According to an exemplary embodiment, the plurality of direct outlets 41 and 42 may include a first direct outlet 41 formed in the second end portion 15b of the connection duct 15, and a pair of second direct outlets 42 symmetrically formed in both left and right sides of the connection duct 15. The first direct outlet 41 may protrude obliquely and downwardly from the second end portion 15b of the connection duct 15 toward the rear of the vehicle by a predetermined length, and the second direct outlets 42 may protrude obliquely from the left and right sides of the connection duct 15 toward the left and right sides of the vehicle by a predetermined length.

Figure 4:
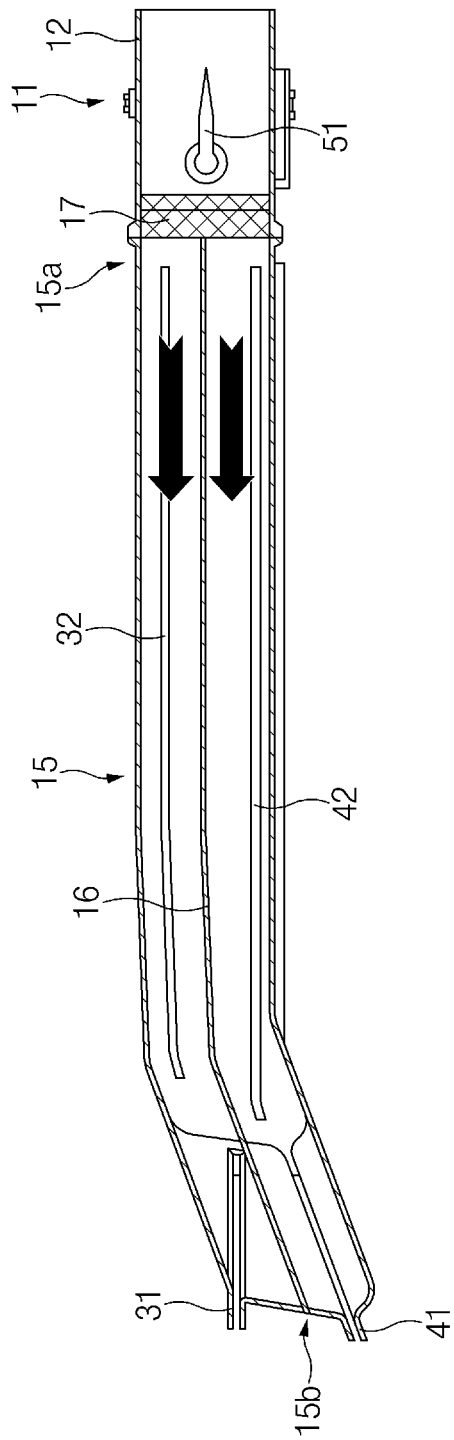
FIG. 4 illustrates a cross-sectional view taken along line A-A of FIG. 2 according to an exemplary embodiment of the present disclosure.

Referring to FIG. 4, the first path 18 may be located above the second path 19, and thus the first diffusion outlet 31 may be located directly above the first direct outlet 41, and the second diffusion outlets 32 may be located directly above the second direct outlets 42, respectively. The first diffusion outlet 31, the first direct outlet 41, the second diffusion outlets 32, and the second direct outlets 42 may have the form of a slim slot having a width of about 3 mm (see FIG. 9), and the surrounding discharge of air up to the rear seats of the vehicle such as second-row seats and third-row seats may be facilitated through the slot-shaped outlets 31, 32, 41, and 42 in a longitudinal direction of the vehicle.

The filter 17 may be disposed adjacent to the outlet of the blower case 12, and the filter 17 may be a high-efficiency particle filter or a combination filter to improve the quality of air blowing into the passenger compartment. The filter 17 may effectively remove fine dust and the like to allow pleasant and fresh air (e.g., improved air quality) to be circulated in the passenger compartment of the vehicle. In particular, since the filter 17 may be located on the upstream side of the connection duct 15, the filtered air may be blown into the first path 18 and the second path 19. The air circulator 10 for a vehicle according to an exemplary embodiment of the present disclosure may include the inlet door 51 pivotally mounted in the blower case 12, and the inlet door 51 may pivot between the first path 18 and the second path 19.

According to an exemplary embodiment, the inlet door 51 may pivot by the door actuator 52. The inlet door 51 may include a shaft 51a and a flap 51b that extends from the shaft 51a. The door actuator 52 may be directly or indirectly connected to the shaft 51a to allow the door actuator 52 to rotate the shaft 51*a*, and the flap 51*b* of the inlet door 51 may be moved by the rotation of the shaft 51*a*. The shaft 51*a* may be aligned with the separation plate 16, and an axis of the shaft 51*a* may be parallel to the separation plate 16. In particular, the shaft 51*a* may be flush with the separation plate 16, and as the inlet door 51 pivots, the flap 51*b* may partially open and close the first path 18 and the second path 19.

The door actuator 52 may be connected to the shaft 51*a* of the inlet door 51, and the door actuator 52 may be attached to a side surface of the blower case 12. In particular, the inlet door 51 may be disposed to face an upstream end of the filter 17, thereby selectively allowing the air to be blown into the first path 18 and/or the second path 19. The inlet door 51 may pivot at the upstream end of the filter 17, and the air may be blown into the first path 18 and/or the second path 19 according to a pivot angle of the inlet door 51. In particular, a rate at which the air is blown into the first path 18 and the second path 19 may be adjusted based on the pivot angle of the inlet door 51. According to an alternative exemplary embodiment, a manual-type link mechanism having an arm, a lever, etc. may be connected to the inlet door 51, and thus an occupant may operate the manual-type link mechanism to allow the inlet door 51 to pivot.

Figure 5:
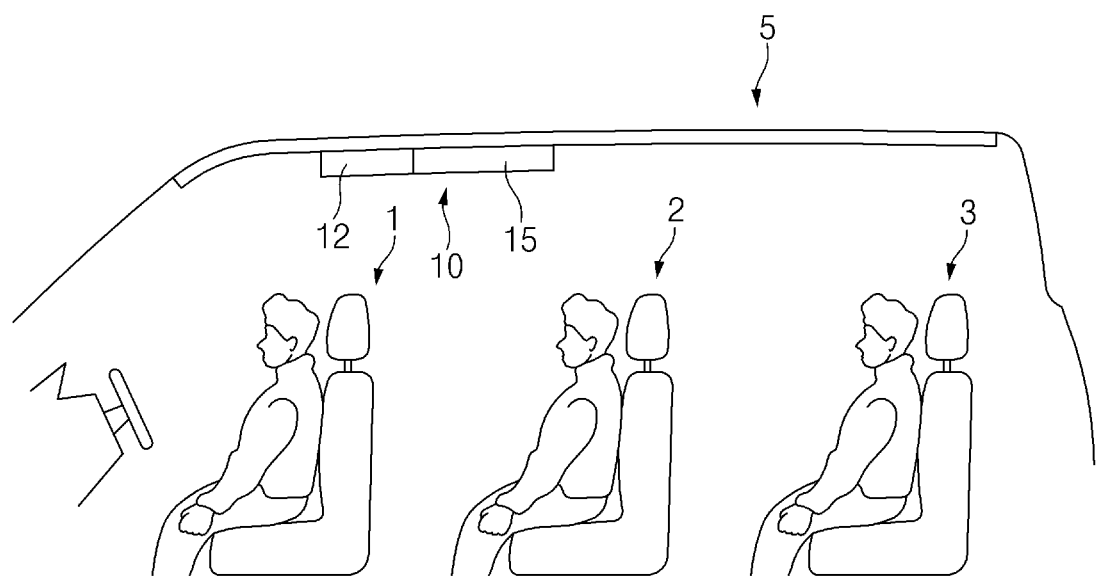
FIG. 5 illustrates the arrangement of an air circulator for a vehicle in a longitudinal direction of a vehicle according to an exemplary embodiment of the present disclosure.

According to an exemplary embodiment, the blower case 12 and the connection duct 15 may extend in the longitudinal direction of the vehicle 5, and thus the air circulator 10 for a vehicle may be mounted on the roof (ceiling) of the vehicle 5 and be arranged in the longitudinal direction of the vehicle 5 as illustrated in FIG. 5. In particular, FIG. 5 illustrates a sport utility vehicle (SUV) equipped with a plurality of rows of seats 1, 2, and 3, in which the air circulator 10 for a vehicle may be located above the first-row seats 1, the second-row seats 2, and the third-row seats 3 of the passenger compartment. For example, the air circulator 10 for a vehicle may be located between the first-row seats 1 and the second-row seats 2. In particular, as the first diffusion outlet 31 and the first direct outlet 41 of the connection duct 15 are arranged to face the second-row seats 2 and the third-row seats 3, the air may be uniformly blown up to the third-row seats 3 as well as the second-row seats 2 to allow the occupants to feel the sense of direct airflow, thereby improving the comfort of the occupants seated in the rear seats.

Figure 6A:
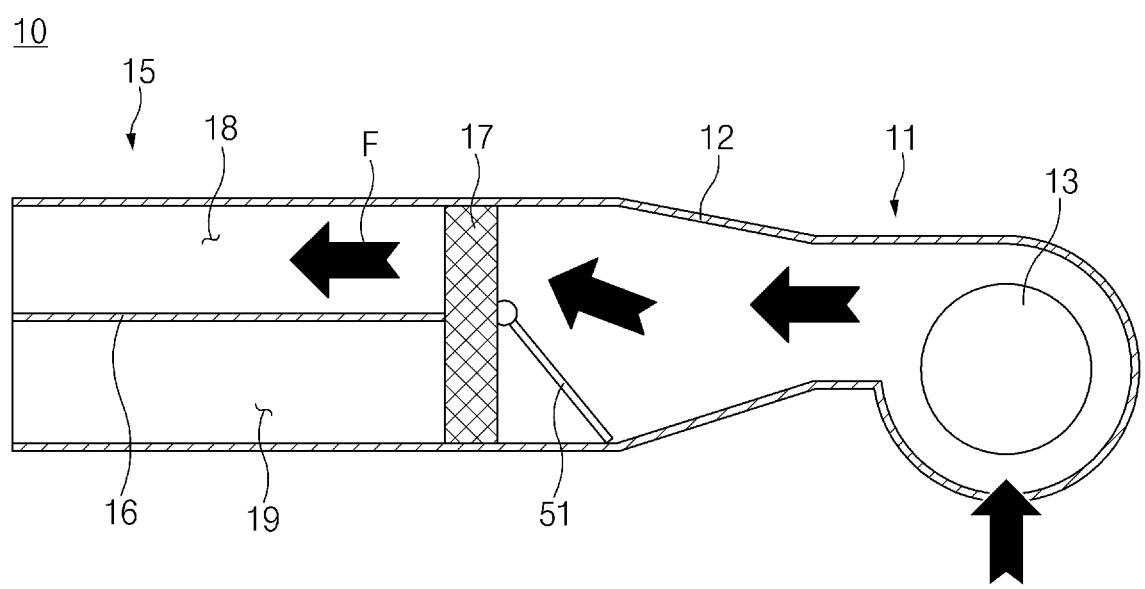
FIG. 6A illustrates the configuration of an air circulator for a vehicle according to an exemplary embodiment of the present disclosure, in which air introduced by a blower unit is blown into a first path.
Figure 7:
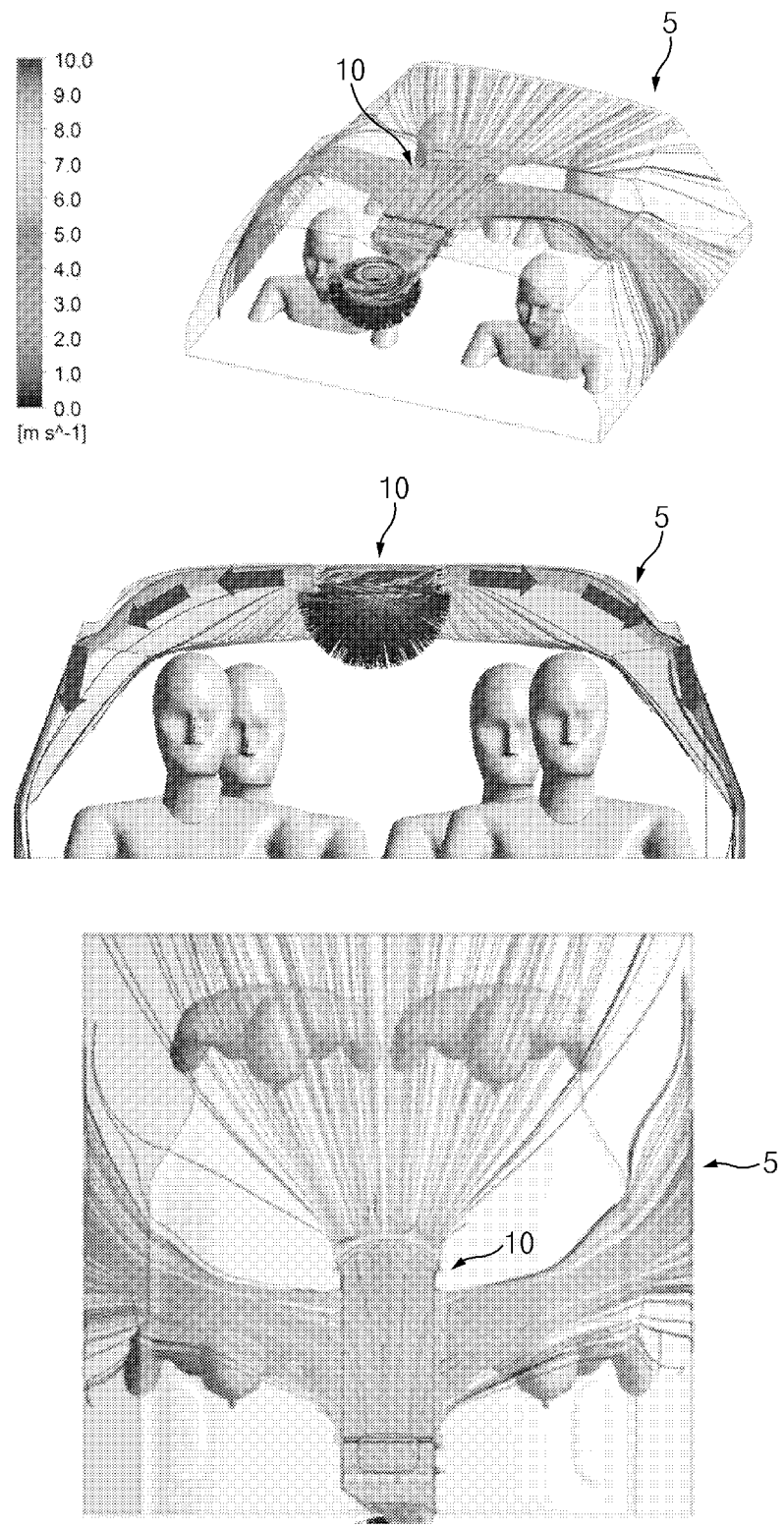
FIG. 7 illustrates a simulation of a diffusion mode in which air is uniformly diffused throughout an entire passenger compartment as the air is discharged horizontally through diffusion outlets.

FIG. 6A illustrates a diffusion mode in which the high-temperature air is blocked from blowing directly to the occupants in an initial starting section of the vehicle and an initial operating section of the air conditioner (e.g., for about 1 minute), and the air may be diffused along the roof of the vehicle to uniformly circulate the air throughout the passenger compartment of the vehicle. Referring to FIG. 6A, when the inlet door 51 pivots to a position in which the inlet door 51 blocks the second path 19, the air introduced by the blower unit 11 may be blown into the first path 18 (see arrow F). Referring to FIG. 7, the air blown into the first path 18 may be discharged horizontally to the ceiling of the passenger compartment through the diffusion outlets 31 and 32. In other words, as the air is discharged horizontally to the ceiling of the passenger compartment through the diffusion outlets 31 and 32, the air may be uniformly diffused into the entire space of the passenger compartment (e.g., the diffusion mode).

Figure 6B:
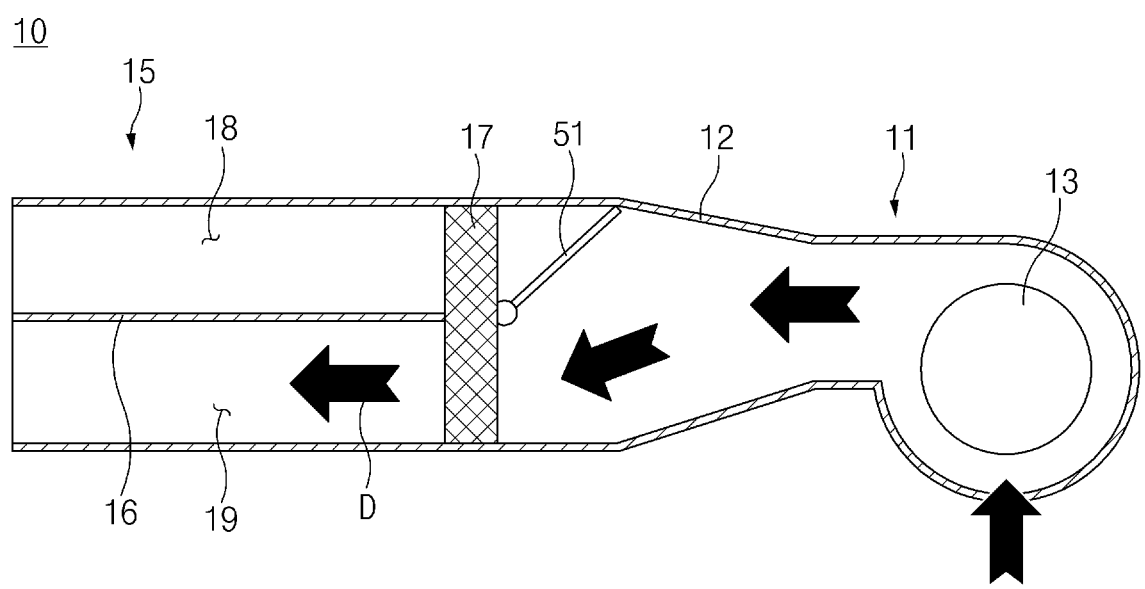
FIG. 6B illustrates the configuration of an air circulator for a vehicle according to an exemplary embodiment of the present disclosure, in which air introduced by a blower unit is blown into a second path.
Figure 8:
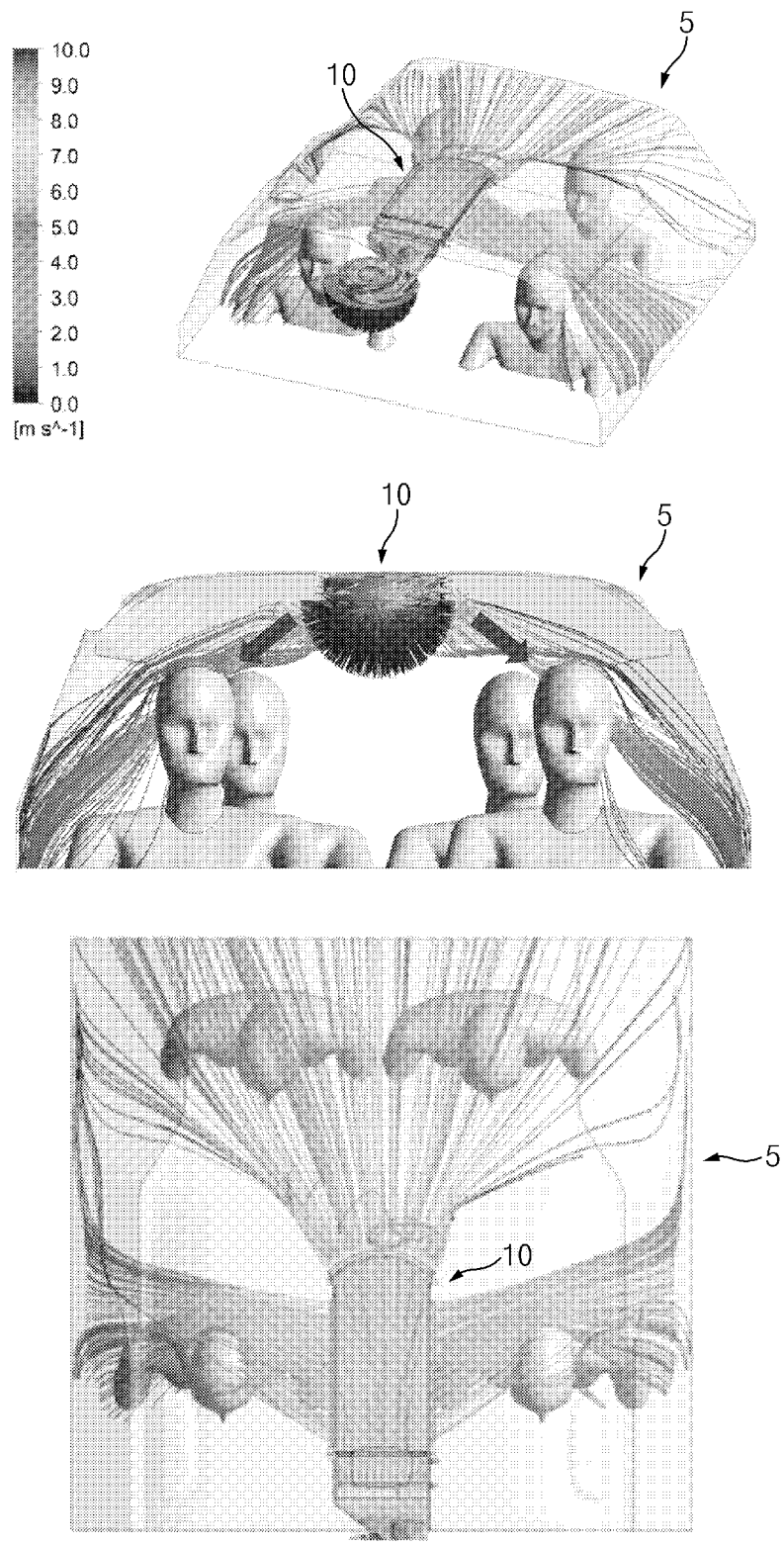
FIG. 8 illustrates a simulation of a direct mode in which air is directly blown to occupants seated in a passenger compartment as the air is obliquely discharged through direct outlets.

FIG. 6B illustrates a direct mode in which the air is directly blown according to the maximum cooling/heating, occupants' preferences, and the like. Referring to FIG. 6B, when the inlet door 51 pivots to a position in which the inlet door 51 blocks the first path 18, the air introduced by the blower unit 11 may be blown into the second path 19 (see arrow D). Referring to FIG. 8, the air blown into the second path 19 may be discharged directly to the occupants in the passenger compartment through the direct outlets 41 and 42. In other words, the air may be discharged directly to the occupants in the passenger compartment (e.g., the direct mode).

Figure 6C:
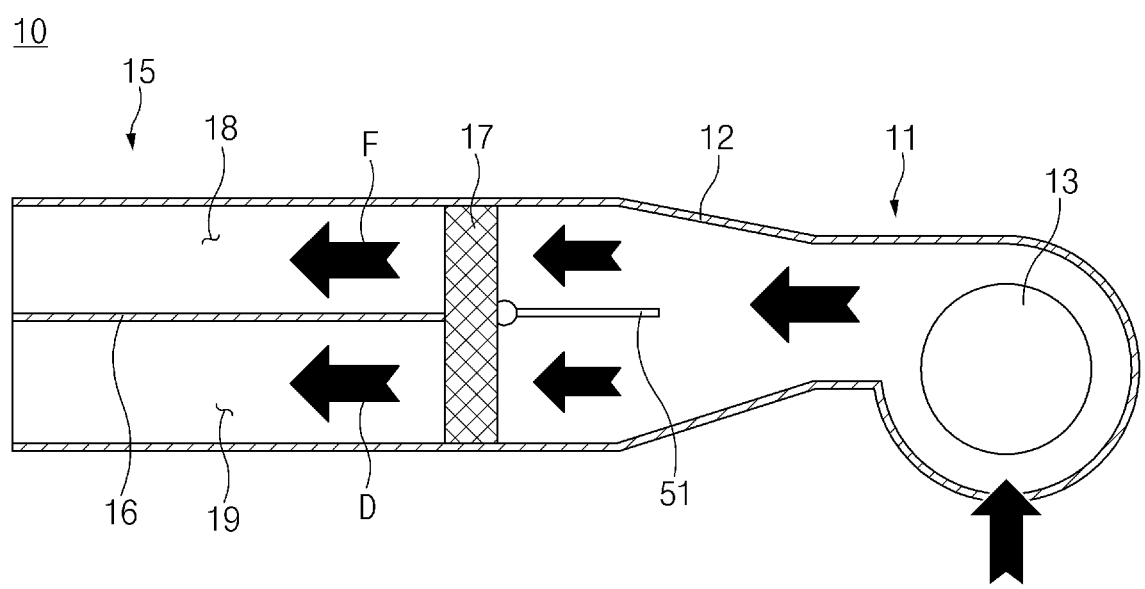
FIG. 6C illustrates the configuration of an air circulator for a vehicle according to an exemplary embodiment of the present disclosure, in which air introduced by a blower unit is blown into a first path and a second path.

FIG. 6C illustrates a hybrid mode in which the diffusion mode and the direct mode are performed together to improve comfort when the room temperature is stabilized by the determination of full automatic temperature control (FATC) and the vehicle is being driven for an extended period of time. Referring to FIG. 6C, when the inlet door 51 pivots to a position in which the inlet door 51 opens the first path 18 and the second path 19, the air introduced by the blower unit 11 may be blown into the first path 18 and the second path 19 simultaneously (see arrows F and D). Referring to FIGS. 7 and 8, the air blown into the first path 18 may be discharged horizontally to the ceiling of the passenger compartment through the diffusion outlets 31 and 32, and the air blown into the second path 19 may be discharged directly to the occupants in the passenger compartment through the direct outlets 41 and 42 (the hybrid mode).

Figure 9:
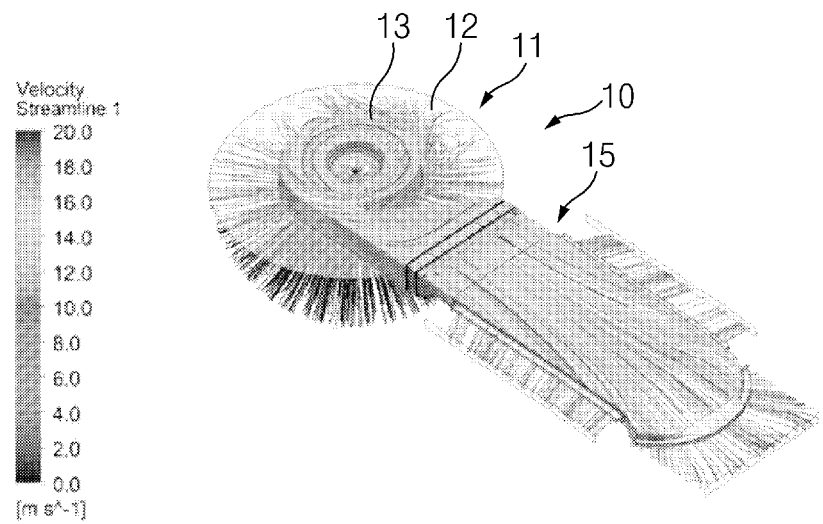
FIG. 9 illustrates a simulation of a hybrid mode in which air introduced by a blower unit is discharged through diffusion outlets and direct outlets.
Figure 9:
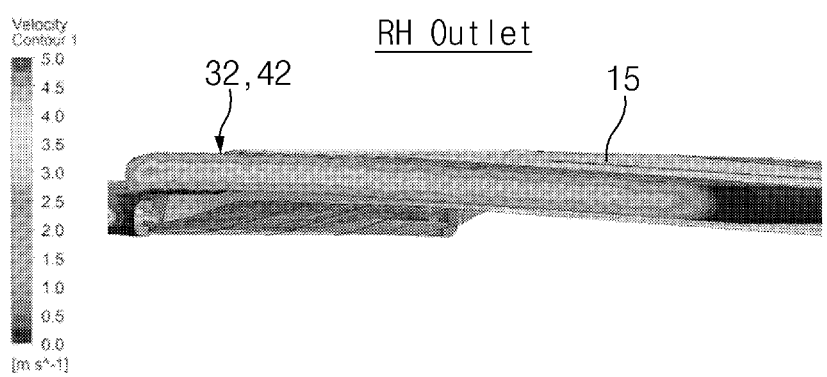
Figure 9:
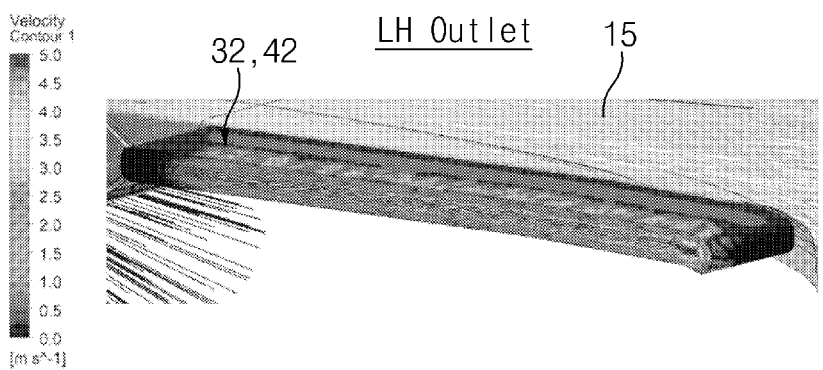

Referring to FIG. 9, the air introduced by the blower unit 11 may be discharged through the blower case 12 and the diffusion outlets 31 and 32 and the direct outlets 41 and 42 of the connection duct 15, and thus the air may be diffused horizontally (see FIG. 7) and/or be blown directly to the occupants (see FIG. 8). According to an exemplary embodiment of the present disclosure, the second diffusion outlets 32 and the second direct outlets 42 may extend in the longitudinal direction of the connection duct 15. Thus, when the air is blown through the second diffusion outlets 32 and the second direct outlets 42 of the connection duct 15 as illustrated in FIG. 9, the air may be discharged at a uniform flow rate through the second diffusion outlets 32 and the second direct outlets 42.

Figure 10:
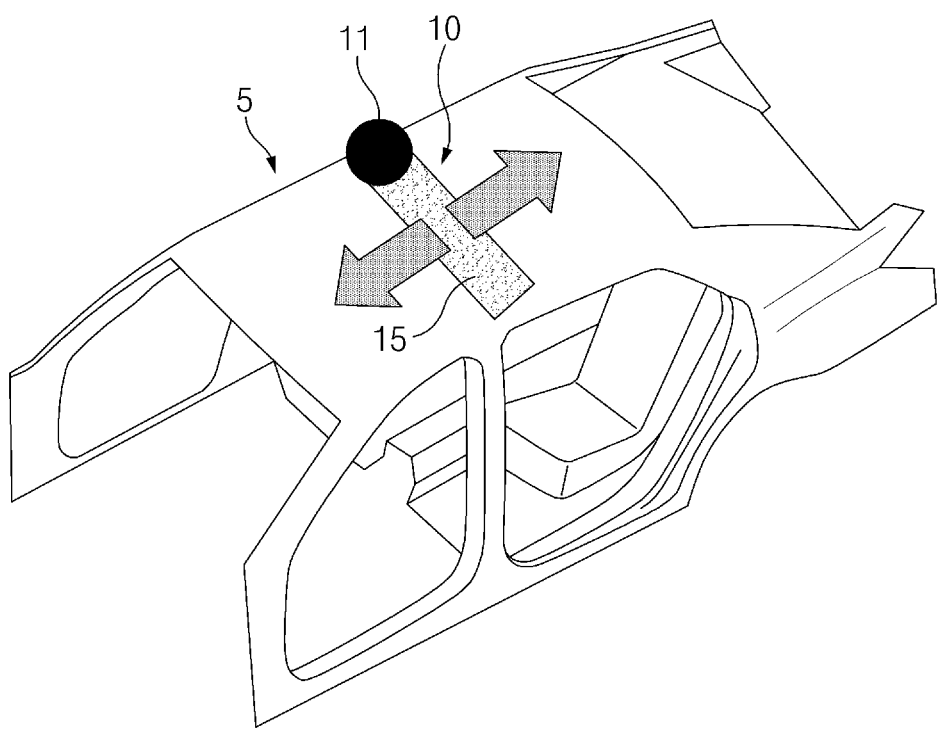
FIG. 10 illustrates the arrangement of an air circulator for a vehicle in a width direction of a vehicle according to an exemplary embodiment of the present disclosure.

According to an exemplary embodiment of the present disclosure, the blower case 12 and the connection duct 15 may extend in a width direction of the vehicle 5, and thus the air circulator 10 for a vehicle may be arranged in the width direction of the vehicle 5 as illustrated in FIG. 10. Thus, the air may be symmetrically blown to the front and rear of the vehicle through the first diffusion outlet 31, the first direct outlet 41, the second diffusion outlets 32 and the second direct outlets 42 of the connection duct 15.

As set forth above, according to exemplary embodiments of the present disclosure, the air circulator for a vehicle may be mounted on the ceiling of the vehicle, and the air may be uniformly blown throughout the entire space from the ceiling of the vehicle to the passenger compartment of the vehicle by the air circulator.

In addition, according to exemplary embodiments of the present disclosure, the air circulator for a vehicle may be implemented by one blower unit 11 without any separate evaporator core and refrigerant mechanism, thereby reducing manufacturing cost and weight. Furthermore, it may perform an air cleaning function on the passenger compartment efficiently by more easily removing the fine dust using the filter 17. As the inlet door 51 pivots, the air may be selectively blown into the first path 18 and/or the second path 19, and thus the air circulator may control the air circulation in various modes such as the diffusion mode, the direct mode, and the hybrid mode.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An air circulator for a vehicle, the air circulator comprising:
    a blower case;
    a wheel/motor assembly mounted in an inlet of the blower case, and including a blower wheel and a blower motor;
    a connection duct connected to an outlet of the blower case, and having a first path and a second path divided by a separation plate;
    a filter mounted in the outlet of the blower case; and
    an inlet door mounted in the blower case to selectively allow air to be blown into the first path and/or the second path;
    wherein the first path is configured to allow the air to diffuse into an entire space of a passenger compartment, and the second path is configured to allow the air to be directly blown to occupants seated in seats of the vehicle,
    wherein the connection duct has a plurality of diffusion outlets that communicate with the first path;
    wherein the plurality of diffusion outlets include a first diffusion outlet disposed in a second end portion of the connection duct, and a pair of second diffusion outlets symmetrically disposed in both left and right sides of the connection duct; and
    wherein the pair of second diffusion outlets extend in a longitudinal direction at least a majority of a length of the connection duct.

2. The air circulator according to claim 1, wherein the separation plate extends in a longitudinal direction of the connection duct, and the first path and the second path are divided by the separation plate in a vertical direction of the connection duct.

3. The air circulator according to claim 1, wherein the first path is located above the second path.

4. The air circulator according to claim 1, wherein the connection duct has a first end portion connected to the outlet of the blower case and the second end portion opposing the first end portion, and the connection duct has a plurality of direct outlets that communicate with the second path.

5. The air circulator according to claim 1, wherein each diffusion outlet protrudes horizontally from the connection duct.

6. The air circulator according to claim 4, wherein each direct outlet protrudes obliquely from the connection duct toward a lower space of a passenger compartment.

7. The air circulator according to claim 4, wherein the plurality of direct outlets include a first direct outlet disposed in the second end portion of the connection duct, and a pair of second direct outlets symmetrically disposed in both left and right sides of the connection duct.

8. The air circulator according to claim 1, wherein the inlet door includes a shaft flush with the separation plate, and a flap that extends from the shaft.

9. The air circulator according to claim 1, wherein the inlet door is disposed to face an upstream end of the filter.

10. The air circulator according to claim 1, wherein the blower case and the connection duct extend in a longitudinal direction of the vehicle.

11. The air circulator according to claim 1, wherein the blower case and the connection duct extend in a width direction of the vehicle.

12. The air circulator according to claim 1, further comprising
    a thermoelectric module mounted to the blower case,
    wherein the thermoelectric module includes an internal portion located inside the blower case and an external portion located outside the blower case.

* * * * *